US011176129B2

(12) United States Patent
Fan et al.

(10) Patent No.: US 11,176,129 B2
(45) Date of Patent: Nov. 16, 2021

(54) METHODS FOR AUTOMATIC SELECTION OF DEGREES OF PARALLELISM FOR EFFICIENT EXECUTION OF QUERIES IN A DATABASE SYSTEM

(71) Applicant: Microsoft Technology Licensing, LLC, Redmond, WA (US)

(72) Inventors: Zhiwei Fan, Fitchburg, WI (US); Rathijit Sen, Madison, WI (US); Harshada Chavan, Plymouth, MN (US); Alan Halverson, Verona, WI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 200 days.

(21) Appl. No.: 16/147,820

(22) Filed: Sep. 30, 2018

(65) Prior Publication Data
US 2020/0104397 A1   Apr. 2, 2020

(51) Int. Cl.
*G06F 16/00*  (2019.01)
*G06F 16/2453*  (2019.01)
*G06F 9/52*  (2006.01)

(52) U.S. Cl.
CPC .......... *G06F 16/24532* (2019.01); *G06F 9/52* (2013.01); *G06F 16/24545* (2019.01)

(58) Field of Classification Search
CPC ................. G06F 16/24532; G06F 16/24545
See application file for complete search history.

(56) References Cited

U.S. PATENT DOCUMENTS

| 6,009,265 | A | * | 12/1999 | Huang | G06F 16/24532 |
| 2010/0312762 | A1 | * | 12/2010 | Yan | G06F 16/24532 707/716 |
| 2012/0215764 | A1 | | 8/2012 | Barsness et al. | |
| 2013/0031555 | A1 | * | 1/2013 | Tobin | G06F 9/4881 718/102 |

(Continued)

OTHER PUBLICATIONS

"International Search Report and Written Opinion Issued in PCT Application No. PCT/US19/39656", dated Sep. 11, 2019, 28 Pages.

(Continued)

*Primary Examiner* — Khanh B Pham
(74) *Attorney, Agent, or Firm* — Fiala & Weaver P.L.L.C.

(57) ABSTRACT

Methods for automatic selection of degrees of parallelism for efficient execution of queries in a database system are performed by systems and devices. An incoming query associated with a query system is received and features of the incoming query are determined. A system state of the query system and a set of executing queries are also determined, along with a query state of each executing query in the set. At runtime of the incoming query, allocation of a degree of parallelism for executing the query is determined by calculating different possible execution times for the incoming query at least partially concurrently with the set of executing queries. Execution times are calculated for different parallel thread options and based on query features, system state, or query states of executing queries. The execution of the incoming query is initialized with the parallel thread option corresponding to a specific execution completion time.

20 Claims, 5 Drawing Sheets

Calculate the plurality of execution times based at least on a machine-learning model that utilizes vectorized query features from a query plan of the incoming query — 402

Determine the one of the set of parallel thread options based at least on an analytical model that utilizes a degree of parallelism from the query state of each executing query in the set — 404

400

(56) References Cited

U.S. PATENT DOCUMENTS

| | | | |
|---|---|---|---|
| 2013/0080418 A1* | 3/2013 | Kashyap | G06F 16/24545 707/718 |
| 2014/0095472 A1 | 4/2014 | Lee et al. | |
| 2015/0186519 A1 | 7/2015 | Popov | |
| 2017/0344395 A1* | 11/2017 | Abe | G06F 9/4881 |
| 2018/0046675 A1* | 2/2018 | Zhou | G06F 16/24549 |
| 2018/0060399 A1 | 3/2018 | Lee et al. | |

OTHER PUBLICATIONS

Li, et al., "Robust Estimation Of Resource Consumption For SQL Queries Using Statistical Techniques", In Proceedings of the VLDB Endowment, vol. 5, Issue 11, Jul. 1, 2012, pp. 1555-1566.

Wu, et al., "Towards Predicting Query Execution Time for Concurrent and Dynamic Database Workloads", In Proceedings of the VLDB Endowment, vol. 6, No. 10, Aug. 26, 2013, pp. 925-936.

\* cited by examiner

METHODS FOR AUTOMATIC SELECTION OF DEGREES OF PARALLELISM FOR EFFICIENT EXECUTION OF QUERIES IN A DATABASE SYSTEM

BACKGROUND

A query may be executed against a database to retrieve information based on elements and operators in the query. Many current solutions for processing queries for databases execute using only a single processing thread, or a degree of parallelism (DOP) of one, or a set number of threads. Some current solutions execute queries using different DOP values in exploration phases during the execution.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for automatic selection of degrees of parallelism for efficient execution of queries in a database system are performed by systems and devices. An incoming query associated with a query system is received and features of the incoming query are determined. A system state of the query system and a set of executing queries are also determined, along with a query state of each executing query in the set. At runtime of the incoming query, allocation of a degree of parallelism for executing the query is determined by calculating different possible execution times for the incoming query at least partially concurrently with the set of executing queries. The execution times are calculated for different parallel thread options and based on the query features, the system state, or the query state of executing queries. The execution of the incoming query is initialized with the parallel thread option corresponding to a specific execution completion time.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
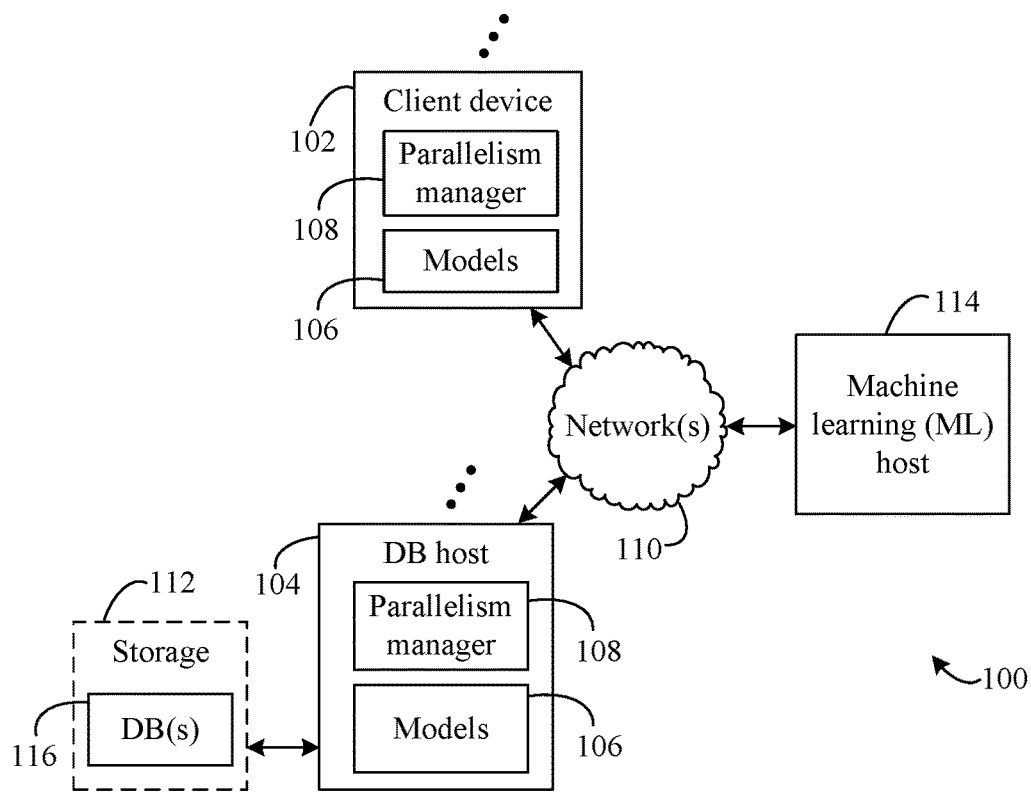
FIG. 1 shows a block diagram of a networked system for automatic selection of degrees of parallelism for efficient execution of queries in a database system, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for automatic selection of degrees of parallelism (DOP) for efficient execution of queries in a database system. Section III below describes example computing device embodiments that may be used to implement features of the embodiments described herein. Section IV below describes additional examples and advantages, and Section V provides some concluding remarks.

II. Example Embodiments for Automatic Selection of Degrees of Parallelism for Efficient Execution of Queries in a Database System Methods, systems, apparatuses, devices, and computer program products are described for automatic selection of degrees of parallelism (DOP) for efficient execution of queries in a database system. For example, an incoming query associated with a query system may be received and various features of the incoming query may be determined. A system state of the query system and a set of executing queries may also be determined, along with a query state of each executing query in the set. At runtime of the incoming query, allocation of a DOP for executing the query may be determined by calculating different possible execution times for the incoming query executed at least partially concurrently with the set of executing queries. The execution times may be calculated for different parallel thread (i.e., DOP) options based on the query features, the system state, and/or the query state of executing queries. The execution of the incoming query may then be initialized with the parallel thread option corresponding to a specific execution completion time.

When determining the optimal DOP value for a given query, and the corresponding optimal/near-optimal value for the number of hardware threads that should be assigned for executing individual queries in a database system, attempting to execute the query with various/different DOP values at runtime to select the best-performing option is problematic. Such an approach is intrusive and results in increased execution times during the exploration phases. Moreover, the workload for executing queries should be constant during the entire exploration phase for more stable and efficient applicability in database and query systems.

Still further, arbitrary DOP values, e.g., DOP=1 or a maximum DOP for all queries, significantly harm performance for database/query systems executing queries against a database. For instance, a DOP of 1 processing thread may provide the slowest possible processing of queries, while a default maximum DOP may result in resource conflicts for system resources such as processor cycles, memory/cache usage, input/output (I/O) transactions, etc., with other executing queries causing increased system overhead (and consequently, decreased performance) to handle such conflicts.

The embodiments herein provide for new approaches to determining the DOP through predictive models to select optimal values for systems in which queries can be executed in a multi-threaded fashion. When utilizing such predictive models according to the embodiments, the optimal DOP values are identified in a single determination period that provides for a stable and efficient workload for processing queries. Additionally, the described embodiments provide for non-intrusive implementations and can be more quickly adapted to changes in workloads.

The DOP selection techniques for query execution described below may be applied to any type of database system that supports multi-threaded queries, such as but not limited to, Microsoft® SQL Server® from Microsoft Corporation of Redmond, Wash. Embodiments may include the utilization of machine learning and/or artificial intelligence models (e.g., supervised learning models, reinforcement learning models, etc.), analytical models (e.g., queuing models, etc.), and other heuristics to predict optimal query DOP options at execution time of incoming queries. These models may take as inputs one or more of the current state of the query/database system, characteristics of the incoming query, a number of queries being processed in the query/database system (i.e., a concurrency level), expected execution times remaining for the currently processed/executing queries, and/or used/available system resources. The described models may be generated via an offline training phase where known data points are used to calibrate the models and/or an online testing/prediction phase where the models are applied to the inputs described above to predict the optimal DOP values for the incoming queries.

In other words, the embodiments disclosed herein provide for automatic and efficient determination of DOP and allocation of processing threads for efficient query execution. These and further embodiments are described in greater detail as follows.

Systems and devices may be configured in various ways for automatic selection of DOP for efficient execution of queries in a database system. For instance, FIG. 1 is a block diagram of a computing system 100 ("system 100" hereinafter), according to embodiments. System 100 is configured to enable efficient allocation of DOP, according to embodiments. As shown in FIG. 1, system 100 includes a client device 102, a database (DB) host 104, and a machine learning (ML) host 114, which may communicate with each other over a network 110. It should be noted that any numbers of client devices, DB hosts, and/or ML hosts may be present in various embodiments. Additionally, any combination of the components illustrated in FIG. 1 may be present in system 100, according to embodiments.

As noted above, client device 102, DB host 104, and ML host 114 are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

DB host 104 may comprise one or more server computers or computing devices, which may include one or more distributed or "cloud-based" servers. In embodiments, DB host 104 may be associated with, or may be a part of, a cloud-based service platform such as Microsoft® Azure® from Microsoft Corporation of Redmond, Wash. DB host 104 may include a storage 112, that may be internal or external to DB host 104, and that stores one or more DBs 116 against which queries may be performed with specifically determined DOP values according to the described embodiments herein. Storage 112 may be any type of storage device or array of devices.

Client device 102 may be any type of computing device or computing system, including a terminal, a personal computer, a laptop computer, a tablet device, a smart phone, a personal digital assistant, a game console or gaming device, a television, and/or the like that may be utilized to query a database.

Client devices and DB hosts described herein may be configured to execute software applications/services for querying databases and for determining DOP options for execution of specific queries. For example, a parallelism manager 108 may be a software application/service configured to determine DOP options for query execution based on models 106. As illustrated, client device 102 and/or DB host 104 may include an instance of parallelism manager 108 and models 106. Parallelism manager 108 may be a part of an operating system (OS) or an application installed at a computing system, may be an application/service itself, etc., in various embodiments. Parallelism manager 108 is configured to determine DOP options for execution of specific queries based on models 106, as described in further detail below.

For example, when a query is provided to DB host 104 for execution against a database, parallelism manager 108 may be configured to receive the incoming query and determine at runtime a DOP option for execution of the query based at least on one or more models of models 106. The determination of the DOP may be based on features of the query, a system state of DB host 104, and other queries being executing by DB host 104. For instance, at runtime of the incoming query, different execution times for the incoming query at least partially concurrently with the set of executing queries may be calculated according to the one or more models using different DOP options, query features, and/or system state attributes. The execution of the incoming query may then be initialized with a DOP value based on the execution times calculated.

Parallelism manager 108 may be implemented in hardware, hardware combined with one or both of software and/or firmware, and/or as program instructions encoded on computer-readable storage media, and may be configured to perform any functions and/or operations described herein for automatic selection of DOP for efficient execution of queries in a database system. In embodiments, an instance of parallelism manager 108 may be implemented in client device 102. In such an example, client device 102 may request system state and executing query information from DB host 104 prior to making determinations for DOP options to be used in executing a query being sent to DB host 104 for execution.

ML host 114 may comprise one or more server computers or computing devices, which may include one or more distributed or "cloud-based" servers. In embodiments, ML host 114 may be associated with, or may be a part of, a cloud-based service platform such as Microsoft® Azure® from Microsoft Corporation of Redmond, Wash. Client device 102 and/or DB host 104 may be configured to provide information associated with DOP selections and query execution to ML host 114 via network 110. ML host 114 may be configured to train/re-train DOP models, such as ones of models 106 described herein, using machine learning techniques based on query data and offline execution of query sets over different DOP values and/or based on the information received. Model training may incorporate general or specific attributes of systems to tune such parameters into the models. In embodiments, neural networks may be implemented by ML host 114 to train and/or update one or more models of models 106.

It should be noted that as described herein, embodiments of ML host 114 are applicable to any type of system where a system for machine learning communicates with client devices and other host devices over a network. One example noted above is where ML host 114 is a "cloud" implementation or service in a network architecture/platform. A cloud platform may include a networked set of computing resources, including servers, routers, etc., that are configurable, shareable, provide data security, and are accessible over a network, such as the Internet. Cloud implementations/services such as for machine learning may run on these computing resources, often atop operating systems that run on the resources, for entities that access the implementations/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

In embodiments, ML host 114 and DB host 104 may comprise a single physical and/or logical system.

Figure 2:
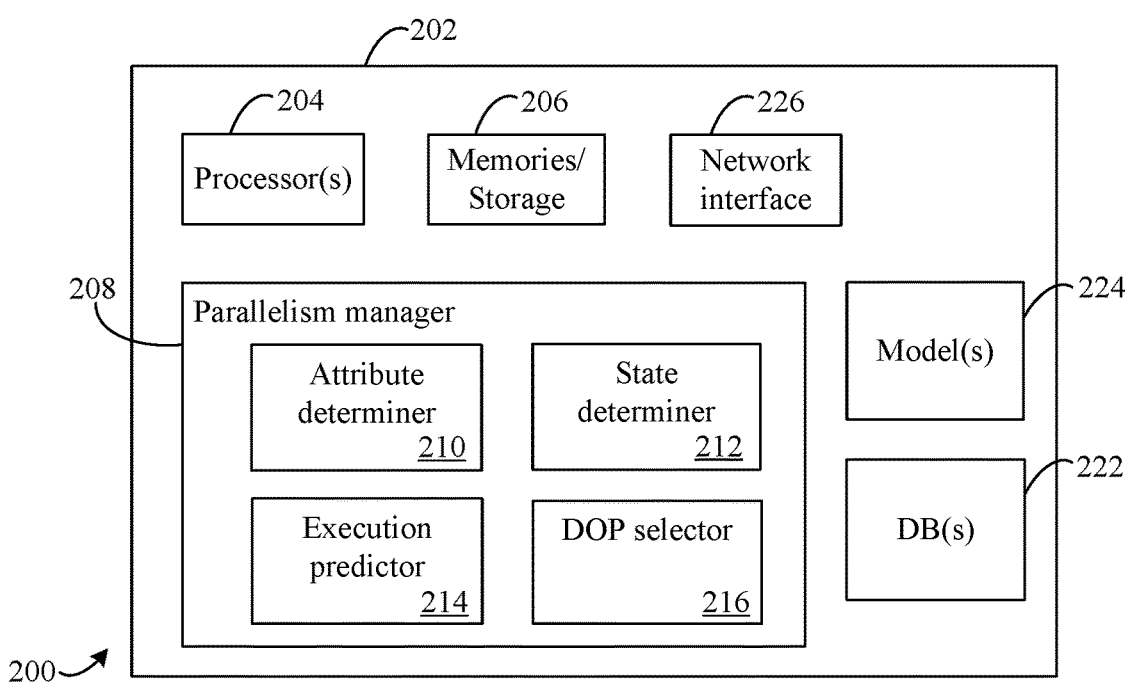
FIG. 2 shows a block diagram of a system for automatic selection of degrees of parallelism for efficient execution of queries in a database system, according to an example embodiment.

Accordingly, a client device such as client device 102 and/or DB host such as DB host 104, may be configured in various ways for improvements and enhancements in automatic selection of DOP for efficient execution of queries in a database system. For example, FIG. 2 is a block diagram of a system 200 configured for such improvements and enhancements. System 200 may be an embodiment of system 100 of FIG. 1, e.g., client device 102 and/or DB host 104. System 200 is described as follows.

System 200 includes a computing device 202, which may be an embodiment of client device 102 and/or DB host 104 of FIG. 1, and may be any type of computer or computing device, as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 226, and a parallelism manager 208 that may be an embodiment of parallelism manager 108 of FIG. 1. System 200 may also include a model(s) 224 and a database(s) (DB(s)) 222 which may respectively be embodiments of models 106 and DB(s) 116 of FIG. 1 described above. System 200 may also include additional components (not shown for brevity and illustrative clarity) including, but not limited to, components and subcomponents of other devices and/or systems herein, as well as those described below with respect to FIG. 9, such as an operating system, etc.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories (e.g., a cache for query processing), remote processors or memories, and/or distributed processors or memories. Processor 204 may be a multi-core processor configured to execute more than one processing thread concurrently. Processor 204 comprises circuitry that is configured to execute computer program instructions such as but not limited to embodiments of parallelism manager 208, which may be implemented as computer program instructions for automatic selection of DOP for efficient execution of queries in a database system, etc., as described herein. Memory 206 is configured to store such computer program instructions/code, as well as to store other information and data described in this disclosure including, without limitation, models of model(s) 224, DBs of DB(s) 222, query features and information, system state information, executing query information, etc.

Network interface 226 may be any type or number of wired and/or wireless network adapter, modem, etc., configured to enable system 200 to communicate with other devices over a network, such as communications between system 200 and other devices utilized in a network as described herein (e.g., client device 102, DB host 104, and/or ML host 114) over a network such as network 110 as described above with respect to FIG. 1.

Parallelism manager 208 includes a plurality of components for performing the functions and operations described herein for automatic selection of DOP for efficient execution of queries in a database system. For instance, parallelism manager 208 may receive queries or information related thereto, and determine a number of processing threads, e.g., a DOP, to be used for execution of the queries. As shown, parallelism manager 208 includes an attribute determiner 210, a state determiner 212, an execution predictor 214, and a DOP selector 216. While shown separately for illustrative clarity, in embodiments, one or more of attribute determiner 210, state determiner 212, execution predictor 214, and/or DOP selector 216, may be combined together and/or as a part of other components of system 200. In some embodiments, less than all of the components of parallelism manager 208 illustrated in FIG. 2 may be included. In software implementations, one or more components of parallelism manager 208 may be stored in memory 206 and are executed by processor 204.

Attribute determiner 210 may be configured to determine feature of an incoming query. Attribute determiner 210 may include a query compiler, as would be understood by those of skill in the relevant art(s) having the benefit of this disclosure. State determiner 212 may be configured to determine a system state of the query system, and determine a set of executing queries and a query state of each executing query in the set. State determiner 212 may include or utilize one or more dynamic management viewers and/or performance monitors to determine states as described herein.

Execution predictor 214 may be configured to calculate execution times for executing the incoming query at least partially concurrently with the set of executing queries. The execution times may be calculated according to different options in a set parallel thread options and based at least on features of the query and/or the system state.

DOP selector 216 may be configured to initialize execution of the incoming query, against the database, with a number of processing threads, e.g., with a DOP, that is at least based on the query state of each executing query in the set and one of the set of parallel thread options having an execution time of the execution times that corresponds to a time of completion attribute.

Accordingly, parallelism manager 208 may operate in various ways to enable improvements in efficient allocation of DOP for execution of queries. Additional details regarding parallelism manager 208 and its components are provided below.

Figure 3:
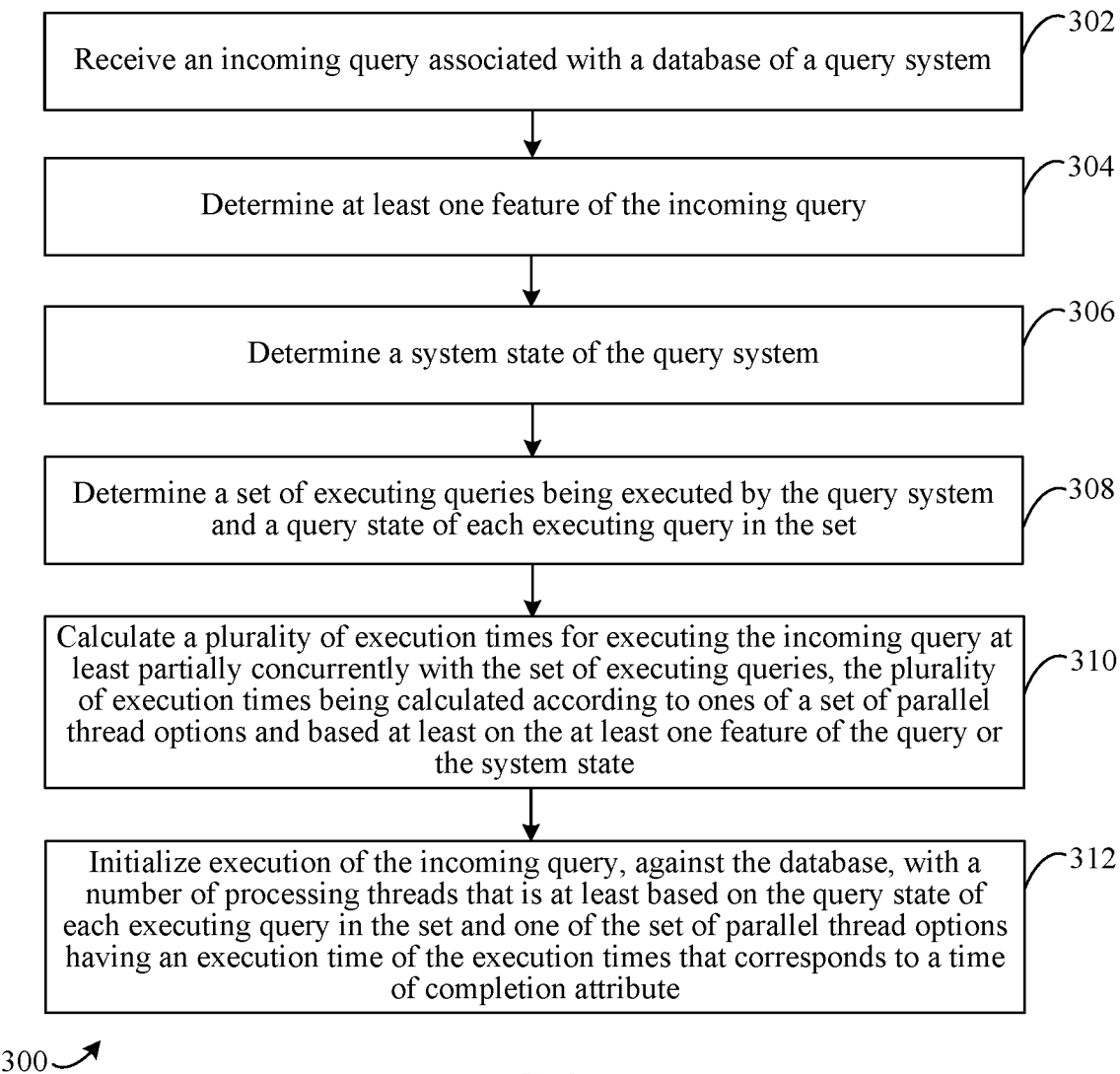
FIG. 3 shows a flowchart for automatic selection of degrees of parallelism for efficient execution of queries in a database system, in accordance with an example embodiment.

For instance, FIG. 3 shows a flowchart 300 for automatic selection of DOP for efficient execution of queries in a database system, according to an example embodiment. Parallelism manager 208 may operate according to flowchart 300, in an embodiment. Further structural and operational examples will be apparent to persons skilled in the relevant art(s) based on the following description. Flowchart 300 is described as follows with respect to system 100 of FIG. 1 and system 200 of FIG. 2.

Flowchart 300 begins at step 302. In step 302, an incoming query associated with a database of a query system is received. For example, computing device 202 and/or parallelism manager 208 of system 200 in FIG. 2 may be configured to receive incoming queries to be run against DB 222. In embodiments, computing device 202 may be a DB host/query system such as DB host 104 of FIG. 1. Incoming queries may be received from a client device, or may be generated by any other type of computing device described herein.

In step 304, at least one feature of the incoming query is determined. For instance, attribute determiner 210 may be configured to determine attributes of incoming queries. Query attributes may be global-level and/or operator-level features/statistics of an incoming query. Query attributes may be, without limitation, a query cost, operator-level details of the query, estimated pages cached, sub-tree costs, hash match attributes, top level attributes, stream aggregate, parallelism scope (e.g., serial versus parallel plan attributes), sorting, nested loops, index scans, spooling, etc. Additionally, features of incoming queries with respect to already running queries as described herein may also be determined and utilized. As a non-limiting example, a check may be made by attribute determiner 210 for query operator overlap. That is, currently executing operators may be checked for whether they overlap with the incoming query.

Attributes of incoming queries may be extracted from the query itself or from the query plan by attribute determiner 210.

In step 306, a system state of the query system is determined. For example, state determiner 212 may be configured to determine the system state of a query system, such as system 200 of FIG. 2 and/or DB host 104 of FIG. 1. State determiner 212 may determine processing thread attributes, input/output (I/O) attributes, and/or memory attributes of the query system. In embodiments, processing thread attributes may include a total number of processing threads in the query system and/or a currently available number of processing threads in the query system. Processing thread attributes may also include overall CPU, or thread-level, performance and/or utilization. I/O attributes may include a measure of data throughput for the query system or the database (e.g., DB(s) 222), and memory attributes may include an availability measure of a buffer cache, e.g., the cache size, available space in the cache, etc.

In step 308, a set of executing queries being executed by the query system is determined and a query state of each executing query in the set is determined. For instance, state determiner 212 may be configured to determine how many queries are currently executing at the query system as a set of queries. State determiner 212 may be configured to monitor queries being executed, update the queries of the set accordingly, and/or store a list of queries in the set in memory 206.

Likewise, state determiner 212 may be configured to determine a query state for each query in the set. A query state for an executing query at the query system may include, without limitation, indicia of work remaining before completion, indicia of work completed since its execution, and/or a number of threads utilized for that query. In embodiments, for currently executed queries in the set, a dynamic management viewer (DMV) may be used to return real-time statistics regarding the executing queries at a processing thread level.

In step 310, a plurality of execution times are calculated for executing the incoming query at least partially concurrently with the set of executing queries, the plurality of execution times being calculated according to ones of a set of parallel thread options and based at least on the at least one feature of the query or the system state. For example, execution predictor 216 may be configured to calculate one or more execution times for the incoming query being executed together or at least partially concurrently with the already executing queries in the set. Execution time calculations may be determined according to a model(s) of model(s) 224, in embodiments as described in further detail herein. Execution time calculations may also be based on query features determined in step 304 and/or the system state determined in step 306.

In step 312, execution of the incoming query is initialized against the database with a number of processing threads that is at least based on the query state of each executing query in the set and one of the set of parallel thread options having an execution time of the execution times that corresponds to a time of completion attribute. For instance, DOP selector 216 may be configured to determine a number of processing threads or a degree of parallelism (DOP). DOP selector 216 may choose an initial number of threads of one of an available set of parallel thread options to be utilized in the query execution against DB(s) 222, as described in step 310 above. For example, the initial number of parallel threads determined to execute the incoming query in the least amount of time may be selected. DOP selector 216 may determine the degree of parallelism, e.g., the final number of processing threads for execution of the incoming query, based on the states of executing queries. In an example embodiment, times to completion and DOP values for executing queries may be modeled with the incoming query's initial number of threads to determine a final number of processing threads/DOP, and the number of processing threads selected may be an absolute number of threads or may be a proportional number of threads of the query system as modeled by DOP selector 216, as described in further detail below.

When the number of processing threads/DOP value is finally determined, parallelism manager 208 may cause the execution against DB 222 of the incoming query to be initialized by the query system, e.g., system 200 or computing device 202, or may indirectly cause initialization of the execution by providing the DOP value to the query system.

Completion attributes of execution times may be, but are not limited to, a least overall amount of time in which the last of the queries (i.e., the incoming query and the currently executing queries) completes, a lowest average time of completion for the queries, a fastest completion time for the incoming query or one of the executing queries, a number of processing cores required, and/or the like. In the example for the number of processing cores required, a determination may be made to achieve a desired balance between performance (e.g., time to completion of execution) and utilization or cost of system resources. Completion attributes may be pre-set by an administrator of the query system, may be dynamically set based on query attributes or an entity submitting the query, or may be pre-set as a default that can be dynamically overridden at execution time.

In embodiments where the number of executing queries in the set is zero, either of DOP selector 216 or execution predictor 214 may be configured to determine the DOP corresponding to the number of threads of an available set of parallel thread options to be utilized in the query execution against DB(s) 222. In this example scenario, when there are zero executing queries in the set, the query state of each executing query in the set is essentially null or ignored for the determination of DOP for the incoming query. Accordingly, execution of the incoming query may be initialized with a DOP corresponding to the parallel thread option having an execution time of the execution times that corresponds to the time of completion attribute, e.g., a fastest time of execution for the query.

That is, DOP selection described herein allows for a determination, at execution time, for more efficient and faster processing of incoming queries against a database that also gives a stable system workload. By determining optimal DOP values for incoming queries just before initiating execution, an up-to-date system state and executing query states may be taken into account to provide for an overall workload minimization for the system.

Figure 4:
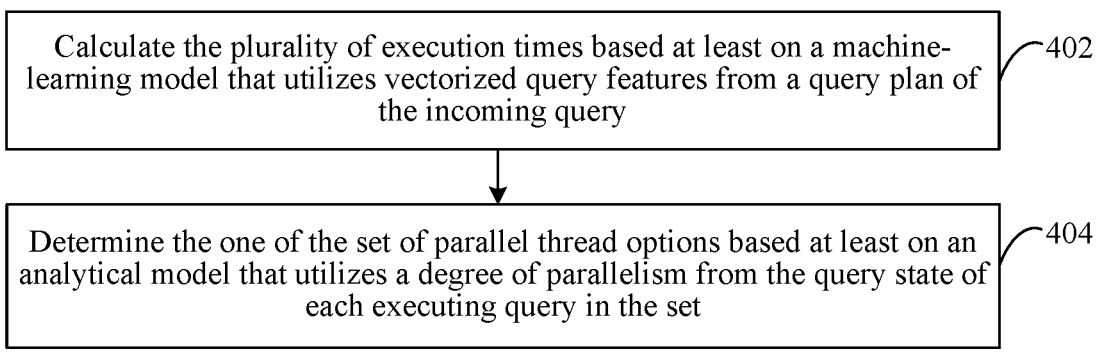
FIG. 4 shows a flowchart for automatic selection of degrees of parallelism for efficient execution of queries in a database system, in accordance with an example embodiment.

FIG. 4 shows a flowchart 400 for automatic selection of DOP for efficient execution of queries in a database system, according to an example embodiment. Parallelism manager 208 may operate according to flowchart 400, in an embodiment. Further structural and operational examples will be apparent to persons skilled in the relevant art(s) based on the following description. Flowchart 400 is described as follows with respect to system 100 of FIG. 1 and system 200 of FIG. 2 and may be an embodiment of flowchart 300 of FIG. 3.

Flowchart 400 begins at step 402. In step 402, the plurality of execution times are calculated based at least on a machine-learning model that utilizes vectorized query features from a query plan of the incoming query. For example, step 402 may be a further embodiment of step 310 flowchart 300 in which execution predictor 214 is configured to utilized a machine learning model to calculate or estimate the execution times. The machine learning model may be a model of models 224 in embodiments.

In step 404, the one of the set of parallel thread options is determined based at least on an analytical model that utilizes a degree of parallelism from the query state of each executing query in the set. For instance, step 404 may be a further embodiment of step 312 flowchart 300 in which DOP selector 216 is configured to utilize an analytical model or heuristic model to determine a DOP value for the incoming query that is based on states of executing queries and their respective degrees of parallelism.

The steps of flowchart 400, as well as flowchart 300 of FIG. 3, are discussed in further detail below with regard to FIG. 5 and FIG. 6.

Figure 5:
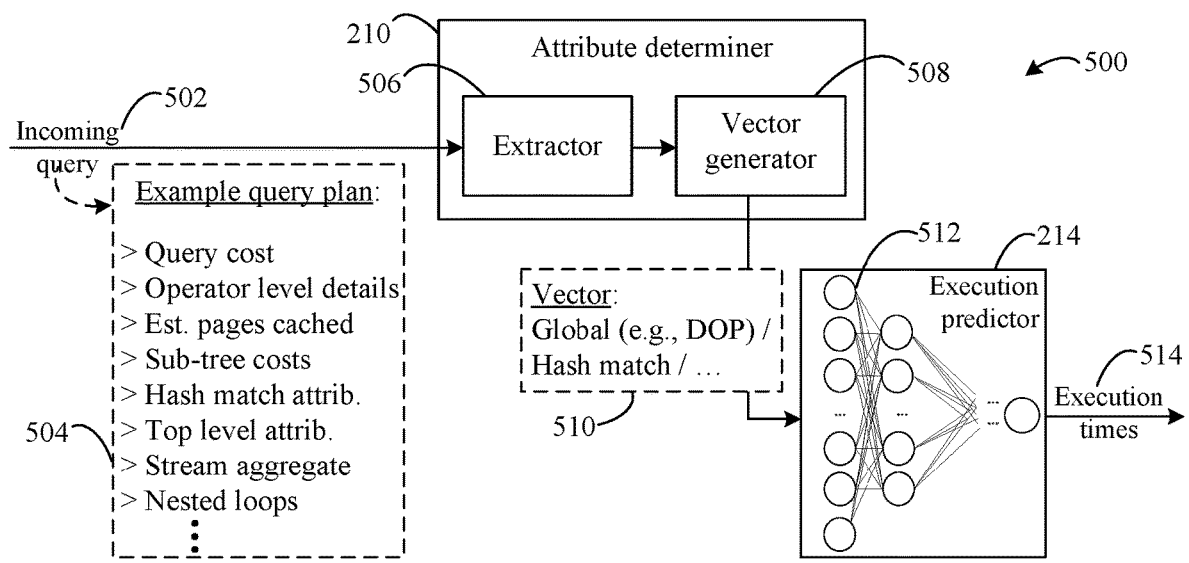
FIG. 5 shows a flow diagram for automatic selection of degrees of parallelism for efficient execution of queries in a database system, in accordance with an example embodiment.

FIG. 5 shows a flow diagram 500 for automatic selection of DOP for efficient execution of queries in a database system, according to an example embodiment. Flow diagram 500 may be a further embodiment of flowchart 300 and/or flowchart 400.

Flow diagram 500 includes attribute determiner 210 of system 200 in FIG. 2. In embodiments, attribute determiner 210 may include an extractor 506 and/or a vector generator 508, described in further detail below, either of which may comprise a portion of a query compiler.

As illustrated, an incoming query 502 is received by attribute determiner 210 of system 200 in FIG. 2. Incoming query 502 includes a query plan 504. Incoming query 502 and query plan 504 may include a number of parameters and/or query attributes such as, but not limited to, a query cost, operator-level details of the query, estimated pages cached, sub-tree costs, hash match attributes, top level attributes, stream aggregate, parallelism, sorting, nested loops, index scans, spooling, etc. Extractor 506 of attribute determiner 210 is configured to determine/extract attributes of incoming query 502 from the query itself and/or from query plan 504.

The extracted attributes of incoming query 502 are passed to a vector generator 508 of attribute determiner 210. Vector generator 508 is configured to generate a vector representation 510 of incoming query 502. Vector representation 510 may include one or more portions that include, without limitation, a global section with DOP information and/or the like, a hash match section with information associated with an Estimated Execution Mode, Estimated Processing Usage, Estimated I/O usage, Estimated Rows, and/or the like, etc. In embodiments, vector generator 508 may preprocess or standardize vector representation 510 for application to a model 512. Model 512 may be one of model(s) 224 described above, and may be a machine learning model that is trained offline.

Execution predictor 214 receives vector representation 510 from vector generator 508 and applies vector representation 510 to model 512 to generate execution times 514. Execution times 514 represent amounts of time that incoming query 502 will take to execute with a give DOP value. In embodiments, vector representation 510 may be applied to model 512 to generate a number of execution times 514 corresponding to one or more different DOP value options available for a given query system.

Vector generator 508 may provide different vector representations 510 each with different DOP values to run against model 512 to determine/estimate execution times 514, or execution predictor 214 may receive a vector representation 510 having an initial DOP value from which execution predictor 214 may iterate over one or more possible DOP values, or execution predictor 214 may receive a vector representation 510 without a DOP value and execution predictor 214 may iterate over one or more possible DOP values. In either of these possible cases, execution predictor 214 may be configured to determine the DOP value corresponding to the fastest time of execution times 514.

It should also be noted that vectors are but one representation for incoming queries, and that other representations are contemplated herein, e.g., based on the type of model used. For example, some representations may retain the inter-operator relationship of the query plan, such as the hierarchical relationship in a tree of operators. In other words, different methods and equivalent components (e.g., for extractor 506 and/or vector generator 508) for extracting information from the query plan and building/generating an internal representation the query may be used for inputs to the models contemplated herein.

Figure 6:
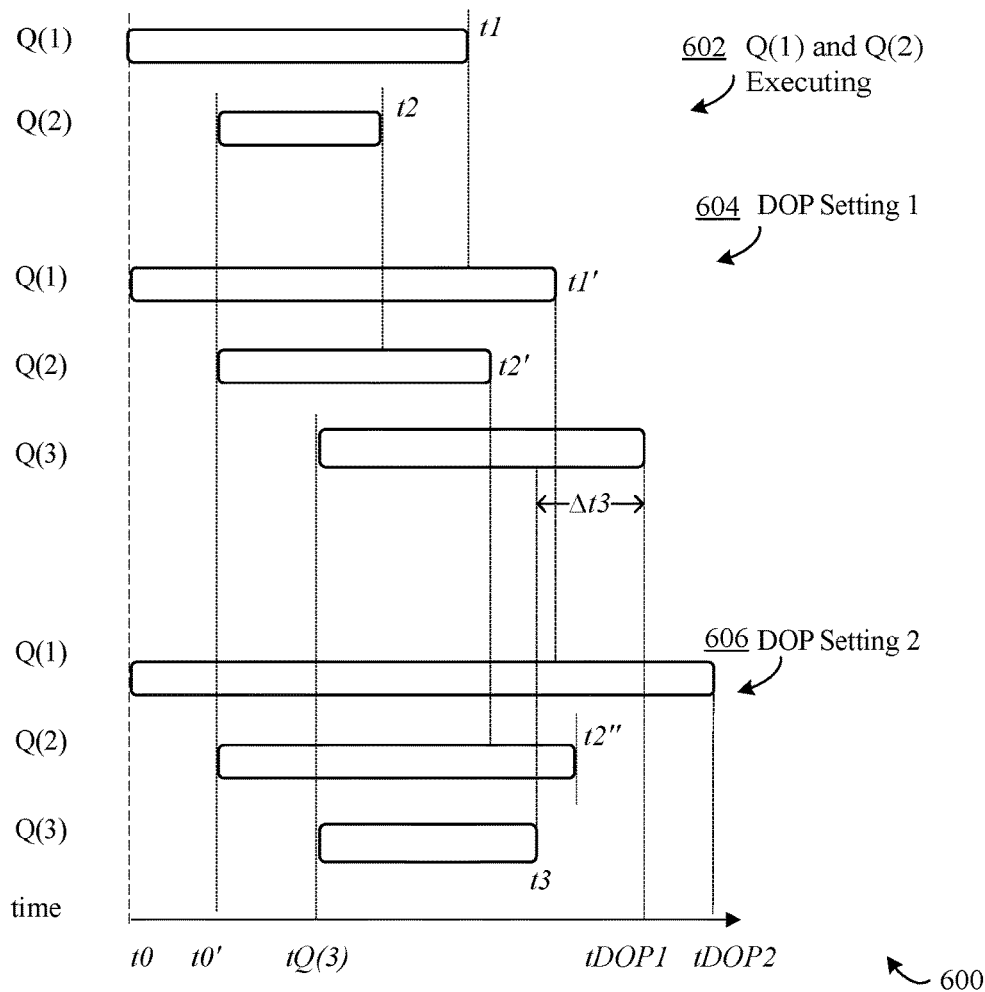
FIG. 6 shows a timing and execution diagram for automatic selection of degrees of parallelism for efficient execution of queries in a database system, in accordance with an example embodiment.

Turning now to FIG. 6, a timing and execution diagram 600 for automatic selection of DOP for efficient execution of queries in a database system is shown, according to an example embodiment. Timing and execution diagram 600 may be a further embodiment of flowchart 300 and/or flowchart 400.

Timing and execution diagram 600 shows timing illustrations for three different execution options, execution option 602, execution option 604, and execution option 606. In execution option 602, a scenario is shown in which a query Q(1) and query Q(2) are being executed against a DB such as DB 222 by a query system such as computing device 202 of system 200 in FIG. 2. That is, Q(1) and Q(2) may be two queries in a set of executing queries as described herein. As illustrated, Q(1) began execution at time t0 according to a first DOP value and Q(2) began execution at time t0' according to a second DOP value. Without the addition of another query to be executed, Q(1) and Q(2) will finish executing at time t1 and time t2, respectively.

Now consider two scenarios in execution option 604 and execution option 606 in which an incoming query Q(3) is received to be run against DB 222 starting at time tQ(3) which is after Q(1) and Q(2) began their respective executions. It was described above how execution predictor 214 may be configured to determine a DOP value from a set of DOP options for which an incoming query, running alone, completes execution in the shortest amount of time. However, when Q(1) and Q(2) are already executing and utilizing query system resources, their execution will affect the execution of incoming query Q(3). Likewise, the execution of Q(3) will affect the execution in progress for Q(1) and Q(2). Accordingly, an analytical model as described herein, which may be one of model(s) 224, may be applied to determine a number of processing threads with which execution of the incoming query Q(3) is initialized.

In execution option 604, a number of processing threads associated with a DOP value DOP1 is modeled for executing incoming query Q(3) with Q(1) and Q(2). With the number of processing threads corresponding to the value DOP1, Q(1) completes execution at time t1', Q(2) completes execution at time t2', and Q(3) completes execution at a final completion time tDOP1.

In execution option 606, a number of processing threads associated with a DOP value DOP2 is modeled for executing incoming query Q(3) with Q(1) and Q(2). With the number of processing threads corresponding to the value DOP2, Q(1) completes execution at a final completion time tDOP2, Q(2) completes execution at a time t2" that is later than t2' but before tDOP2, and Q(3) completes execution at a time t3 that is before tDOP1 and tDOP2.

It should be noted here that for execution option 606, incoming query Q(3) finishes at time t3 which is earlier than time tDOP1 of execution option 604 by a value of Δt3. However, because the final completion time tDOP1 of execution option 604 is earlier than the final completion time tDOP2 of execution option 606, tDOP1 corresponds to a minimized workload time (i.e., the completion time across all queries executing is minimized). Thus, the number of processing threads corresponding to the value DOP1 for executing Q(3) may be preferred and used, according to embodiments. In other embodiments, the times of tDOP2, t2", and t3 may average less than the times tDOP1, t2', and t1', and thus the value DOP2 for executing Q(3) may be preferred and used to determine a number of processing threads.

In the example embodiments described above for an earliest final completion time (e.g., as described for tDOP1 corresponding to value DOP1) and/or a lowest average completion time, the analytical model described herein and in further detail below with respect to FIG. 7 may be configured to determine the final completion times based on query states of executing queries and their respective DOP values.

Figure 7:
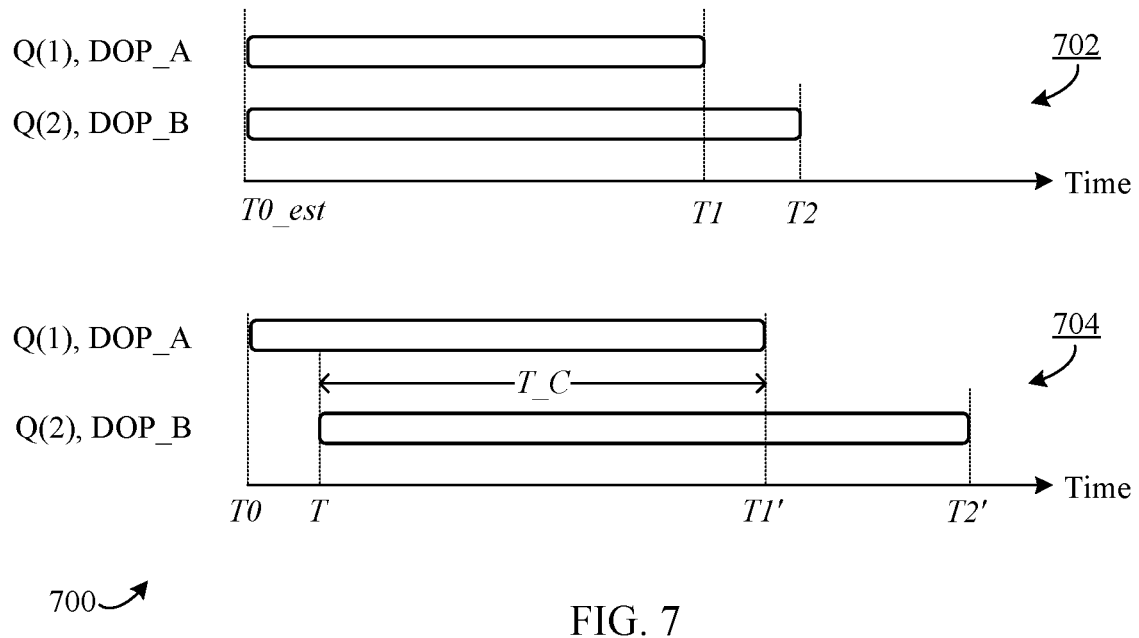
FIG. 7 shows a timing and execution diagram for automatic selection of degrees of parallelism for efficient execution of queries in a database system, in accordance with an example embodiment.

Referring now to FIG. 7, a timing and execution diagram 700 for automatic selection of DOP for efficient execution of queries in a database system is shown, according to an example embodiment. Timing and execution diagram 700 may be a further embodiment of flowchart 300, flowchart 400, flow diagram 500, and/or flowchart 600. Timing and execution diagram 700 includes an individual execution determination 702 as described above for flow diagram 500, as well as a concurrent execution determination 704 illustrating application of an analytical model of model(s) 224.

For instance, in a query system such as computing device 202 of system 200 in FIG. 2, it may be assumed that a finite number of equivalent logical/processor cores 'N' are available to execute processing threads for queries, e.g., as logical cores described in the Equations below. As illustrated in individual execution determination 702, the most efficient DOP values and corresponding times for individual (not concurrent) execution of Q(1), e.g., DOP_A, initialization at time T0_estimate, and an ending time of execution 'T1', and of Q(2), e.g., DOP_B, initialization at time T0_estimate, and an ending time of execution 'T2', may be determined/estimated as described herein, such as with respect to FIG. 5 and flow diagram 500. That is, when Q(1) is received, its time to completion T1 according to the value of DOP_A may be estimated and stored. Later, when Q(2) is received and Q(1) is executing, its time to completion T2 according to the value of DOP_B may be estimated and stored.

In this example, it may also be assumed for the analytical model, though not required, that processor cores are fairly shared among processing threads and that each query Q(1) and Q(2) are allocated a proportional number of processing threads (and/or logical/processor cores). The proportion may be based at least on execution times and/or DOP values, e.g., the number of logical cores used may be the DOP value for the incoming query divided by the sum of the DOP values for all queries in the system. It should also be noted that values for DOP_A and DOP_B may be different or the same in various examples.

In the example embodiment described, the analytical model may be conceptualized in three parts—(1) when portion of Q(1) is executing alone, (2) when Q(1) and at least a portion of Q(2) overlap with respect to execution, and (3) when Q(1) has finished execution and the remaining portion of Q(2) executes alone. The set of equations below exemplarily describe one approach to model these three parts, although other analytical models may be used according to embodiments. It is also contemplated herein that other models may choose to treat a hyper-thread to be weaker than a full physical core and thus make a distinction between threads being scheduled on separate physical cores versus threads scheduled on separate hyper-threads on the same physical core.

Continuing with the example above, it may be assumed that the value for DOP_A is fixed for Q(1) during its execution as shown in concurrent execution determination 704. Subsequent to initialization of Q(1) at T0, the incoming query Q(2) is received to be initialized at time T. In order to determine times T1' and T2' accounting for the concurrent (at least partially) execution of Q(1) and Q(2), the analytical model may be utilized as described below, according to example embodiments.

A DOP value for Q(2), i.e., DOP_B, is to be determined as similarly described above with respect to the examples of execution option 604 and execution option 606 of FIG. 6. According to the analytical model in this example, the number of processor cores 'C1' used by query Q(1) may be determined by:

$$C1 = \frac{N * DOP\_A}{(DOP\_A + DOP\_B)}. \quad \text{(Eq. 1)}$$

The number of processor cores 'C2' used by query Q(2) may be determined by:

$$C2 = \frac{N * DOP\_B}{(DOP\_A + DOP\_B)}. \quad \text{(Eq. 2)}$$

A normalizing factor for proportional allocation of processor cores may be utilized in embodiments. In embodiments, normalization may be performed based on processing cores, but for the described example herein, normalization is performed based on DOP. For instance, the normalized factor 'f1' for Q(1) may be:

$$f1 = \frac{C1}{N}, \quad \text{(Eq. 3)}$$

and the normalized factor 'f1' for Q(1) may be:

$$f2 = \frac{C2}{N}. \quad \text{(Eq. 4)}$$

The concurrent execution time (T_C) may be defined as the time that both Q(1) and Q(2) are executing concurrently. As shown in FIG. 7, T_C is the time between time T and the completion of execution for Q(1) at time T'. The remaining concurrent execution time T1_C for Q(1) may be determined as:

$$T1\_C = \frac{(T1 - T)}{f1}, \quad \text{(Eq. 5)}$$

and the remaining concurrent execution time T2_C for Q(2) may be determined as:

$$T2\_C = \frac{T2}{f2}. \quad \text{(Eq. 6)}$$

Assuming for this example that Q(1) finishes earlier than Q(2) (i.e., T1_C<T2_C), then:

$$T1'=T+T\_C, \quad \text{(Eq. 7)}$$

and $$T2'=T\_C+(T2\_C-T\_C)*f2. \quad \text{(Eq. 8)}$$

Accordingly, for a given value of DOP_B for Q(2), a time T1' when execution of Q(1) completes and a time T2' when execution of Q(2) completes may be determined using the above analytical model for cases where execution of these queries overlaps (i.e., is performed at least partially concurrently). Similarly, this example may be extended for multiple currently-executing queries and/or multiple incoming queries.

A query system, e.g., via DOP selector 216, may be configured to iterate over one or more possible values of DOP_B to determine which specific value of DOP_B provides for a scenario, in which for that specific value of DOP_B, T1' or T2' (whichever represents the later completion time for a given value of DOP_B) is an earlier time than all other times T1' and T2' that represent the later completion times for other values of DOP_B. In this way, workload minimization is achieved.

In scenarios where times T2' for different values of DOP_B are equal or approximately equal, a value for DOP_B may be selected which has a corresponding time T1' that is lowest of the times T1' for the different values of DOP_B with equal/approximately equal times T2'.

Figure 8:
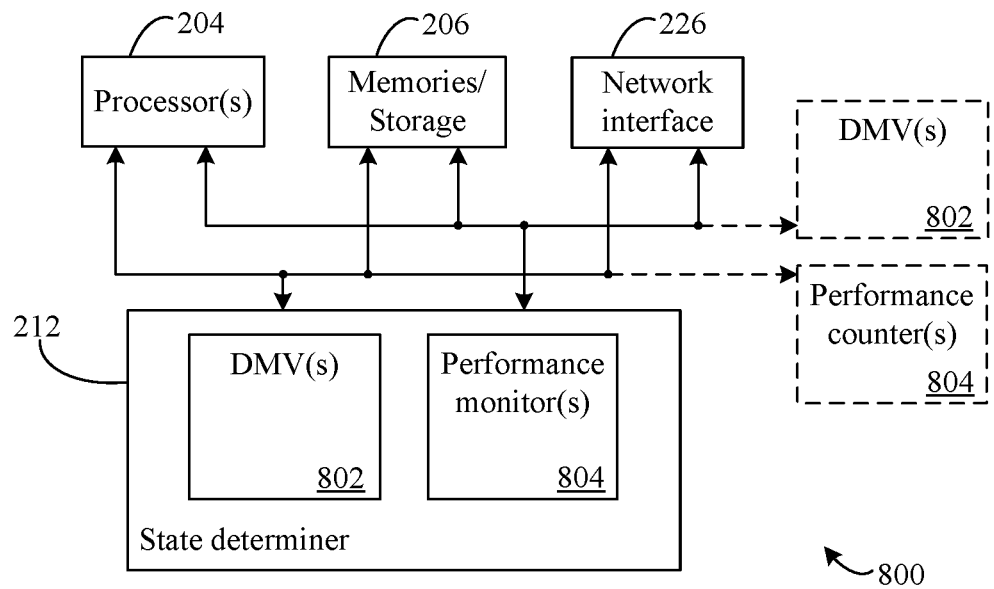
FIG. 8 shows a block diagram of a system for automatic selection of degrees of parallelism for efficient execution of queries in a database system, in accordance with an example embodiment.

Turning now to FIG. 8, a system 800 for automatic selection of DOP for efficient execution of queries in a database system is shown, according an example embodiment. System 800 may be a further embodiment of system 200 of FIG. 2, or a portion thereof, and includes processor(s) 204, memory 206, network interface 226, and state determiner 212 described above for system 200.

In the illustrated embodiment, system 800 further includes a dynamic management viewer(s) 802 ("DMV 800") and/or a performance monitors (s) 804, each of which may also be configured to determine at least a portion of processing thread attributes, I/O attributes, and/or memory attributes, along with or lieu of state determiner 212.

For instance, processing thread attributes or processor attributes generally may be determined by state determiner 212, DMV(s) 802, and/or performance monitor(s) 804. As an example, when many tasks are waiting in a runnable queue of processor(s) 204, these tasks must wait even if all resources of system 800 (other than processor(s) 204) are available. In other words, the performance bottleneck is processor(s) 204. In embodiments, associated waits may include, without limitation, a signal_wait_time for wait type SOS_SCHEDULER_YIELD, a Total_time for CXPACKET, THREADPOOL (a hard requirement for queries to be executed serially), CMEMTHREAD which occurs when a task is waiting for a thread-unsafe memory object, and/or the like. Such waits may be monitored by ones of performance monitor(s) 804, such as but not limited to: a processor/% Privileged Time monitor, a processor/% User Time monitor, a process (sqlserver.exe)/% Processor Time monitor, etc.

Memory and buffer cache attributes for memory 206 may be determined by state determiner 212, DMV(s) 802, and/or performance monitor(s) 804. As an example, waits associated with memory 206 may be, without limitation, PAGE-LATCH_*, LATCH_*, and/or the like. Ones of DMV(s) 802 may be configured to monitor such waits, including but not limited to, Sys.dm_os_waiting_tasks, Sys.dm_io_virtual_file_stats, etc. Similarly, a Physical Disk\Avg. Disk sec/Read performance monitor of performance monitor(s) 804 may monitor I/O waits.

I/O attributes associated with network interface 226 and/or a storage disk of memory 204 may be determined by state determiner 212, DMV(s) 802, and/or performance monitor(s) 804. For example, it may be observed if there are PAGEIOLATCH waits in conjunction with buffer pool pressure indicators. Associated waits may include without limitation: PAGEIOLATCH_XX, WRITELOG, ASYNC_IO_COMPLETION, IO_COMPLETION, and/or the like. DMVs of DMV(s) 802 such as, but not limited to, Page Life Expectancy (an indication of pressure on buffer pool), Free List Stalls/sec (an indication of pressure on buffer pool), etc., may determine such waits.

It is also contemplated that other types of viewers/monitors may be implemented. In embodiments where the DB runs SQL OS, performance monitors such as buffer cache hit ratio (a percent of page requests satisfied by data pages from the buffer pool), e.g., SELECT object_name, counter_name, cntr_value FROM sys.dm_os_performance_counters WHERE object_name LIKE '% Buffer Manager %' AND counter_name='Buffer cache hit ratio', may be used to determine memory pressure. Page Life Expectancy (a duration, in seconds, that a page resides in the buffer pool) may be utilized to determine availability of memory 206 (e.g., memory 206 availability is high when the Page Life Expectancy value is over 1,000, but is low when the value is below 300. Locks (which are also available for latches) may also be utilized for SQL OS, e.g., SELECT object_name, counter_name, cntr_value FROM sys.dm_os_performance_counters WHERE object_name LIKE '% Locks %' AND counter_name='Lock Requests/sec' and instance_name='_Total'; or SELECT object_name, counter_name, cntr_value FROM sys.dm_os_performance_counters WHERE object_name LIKE '% Locks %' AND counter_name='Lock Timeouts/sec' and instance_name='_Total'.

For currently executed queries, a sys.dm_exec_query_profiles DMV of DMV(s) 802 may be used to return live/real-time statistics regarding the executing queries at a processing thread level. In embodiments, state determiner 212 may perform step 308 of flowchart 300 in FIG. 3 accordingly.

In some embodiments, DMV(s) 802 and/or performance counter(s) 804 may reside outside of state determiner 212 in system 800 where state determiner 212 may utilize DMV(s) 802 and/or performance counter(s) 804 to determine the attributes described above. It should also be noted that counters, etc., corresponding to different operating systems, different DBs, different DB management systems, and/or the like, may be used, according to embodiments.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, such as system 100 of FIG. 1 and system 200 of FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a computing device in stationary or mobile computer embodiments, including one or more features of mobile systems and/or computing devices described herein, as well as alternative features. The descriptions of computing devices/systems provided herein are provided for purposes of illustration, and are not intended to be limiting. Embodiments may be implemented in further types of computer systems, as would be known to persons skilled in the relevant art(s).

Figure 9:
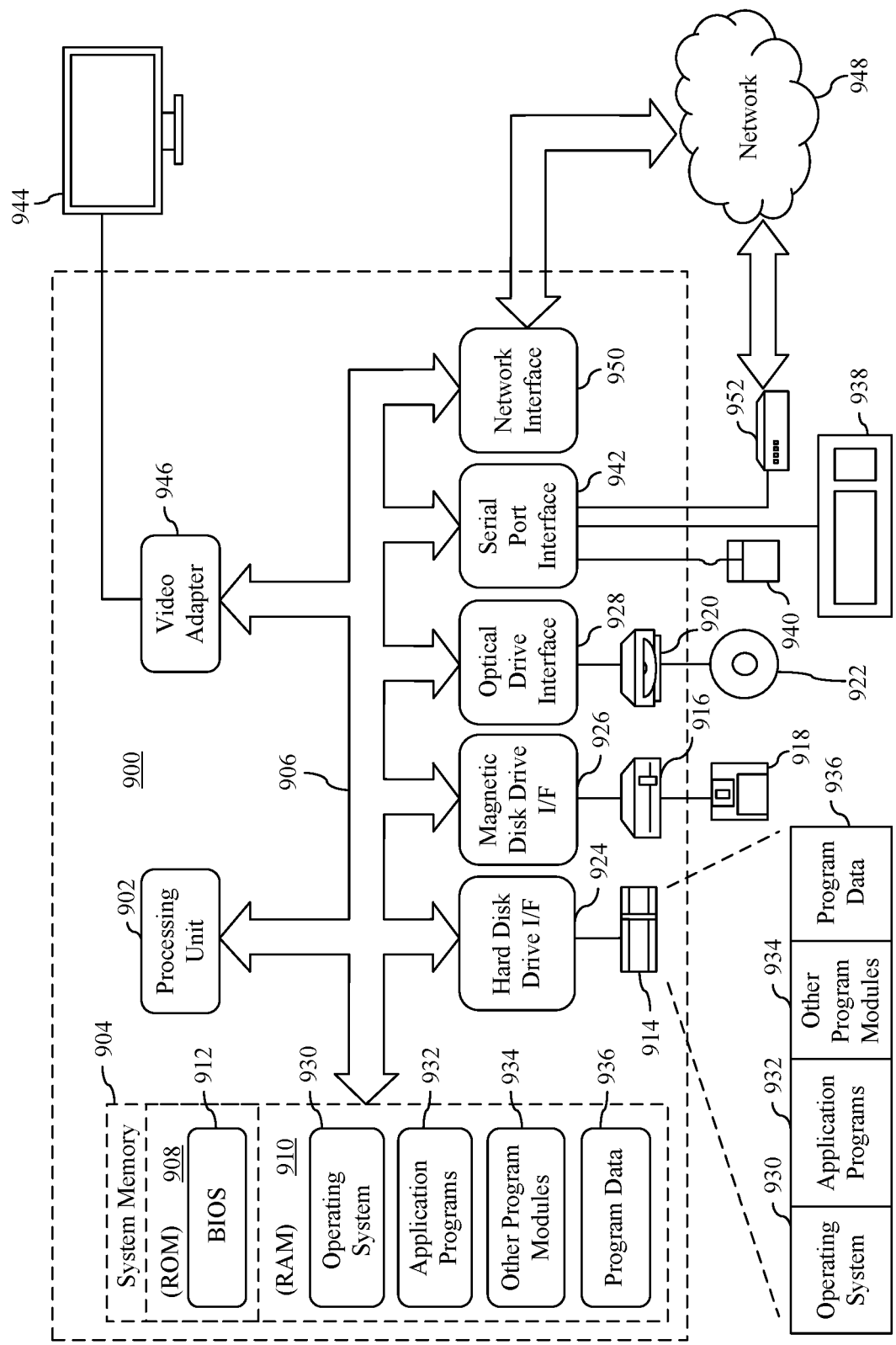
FIG. 9 shows a block diagram of an example computing device that may be used to implement embodiments.

FIG. 9 depicts an exemplary implementation of a computing device 900 in which embodiments may be implemented. For example, embodiments described herein may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems and/or game consoles, etc., as would be known to persons skilled in the relevant art(s).

As shown in FIG. 9, computing device 900 includes one or more processors, referred to as processor circuit 902 (also "processing unit" herein), a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing embodiments described herein, such as system 100 of FIG. 1 and system 200 of FIG. 2, as well as the flowcharts/flow diagrams described herein, including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

While embodiments described in the Sections above may be described in the context of queries run against a database, the embodiments herein are not so limited and may also be applied for other types of requests, jobs, functions, and/or processes that may be run, e.g., concurrently, with DOP.

Furthermore, the described embodiments do not exist in software implementations for enhancements and improvements for automatic selection of DOP for efficient execution of queries in a database system. Conventional solutions lack the ability to determine stable values for DOP at the time of execution of queries, and fail to take into account currently executing queries that will be running when incoming query execution is initialized. That is, conventional solutions do not allow for a robust and efficient determination of DOP for queries where the selected DOP is the most efficient DOP option and is maintained during the execution of the incoming query to provide for system stability and minimized workload impact.

Still further, the described embodiments provide for query execution using the most efficient DOP to execute single queries, and DOPs that allow for the most efficient overall execution of incoming queries with currently executing queries. Optimal DOP values are identified in a single determination period that provides for a stable and efficient workload for processing queries. The selection of optimal/near-optimal DOP values for incoming queries not only improves execution times and resource allocation for the incoming query itself, but also minimizes performance impact for queries that are currently being executed. Additionally, the described embodiments provide for non-intrusive implementations and can be more quickly adapted to changes in workloads. In other words, the embodiments herein improve the performance of hardware systems such as database/query systems that execute queries by reducing the number of processing cycles, memory footprint, and I/O transactions required for such execution.

The additional examples and embodiments described in this Section may be applicable to examples disclosed in any other Section or subsection of this disclosure.

A system is described herein. The system may be configured and enabled in various ways for automatic selection of DOP for efficient execution of queries in a database system, as described herein. The system includes processing system with one or more processors and a memory that stores program code to be executed by the processing system.

The program code is configured to receive an incoming query associated with a database of a query system, and to determine at least one feature of the incoming query. The program code is also configured to determine a system state of the query system, and to determine a set of executing queries being executed by the query system and a query state of each executing query in the set. The program code is also configured to calculate a plurality of execution times for executing the incoming query at least partially concurrently with the set of executing queries, the plurality of execution times being calculated according to ones of a set of parallel thread options and based at least on the at least one feature of the query or the system state. The program code is further configured to initialize execution of the incoming query, against the database, with a number of processing threads that is at least based on the query state of each executing query in the set and one of the set of parallel thread options having an execution time of the execution times that corresponds to a time of completion attribute.

In an embodiment of the system, the time of completion attribute is an earliest time of completion.

In an embodiment of the system, the query state of each executing query in the set respectively comprises one or more of indicia of work remaining before completion, indicia of work completed since its execution, or a number of threads utilized, for an associated executing query.

In an embodiment of the system, the system state includes at least one of a processing thread attribute that includes at least one of a total number of processing threads or a currently available number of processing threads, an input/output (I/O) attribute that includes a measure of data throughput for the query system or the database, or a memory attribute that includes an availability measure of a buffer cache.

In an embodiment, the system further comprises at least one of a dynamic management viewer or a performance counter, each of which is configured to determine at least a portion of one or more of the processing thread attribute, the I/O attribute, or the memory attribute.

In an embodiment of the system, the at least one feature of the incoming query is obtained from a query plan and includes a query cost or operator level details.

In an embodiment of the system, the program code includes an execution predictor and a parallelism selector. The execution predictor is configured to calculate the plurality of execution times based at least on a machine-learning model that utilizes vectorized query features from a query plan of the incoming query, and the parallelism selector is configured to determine the one of the set of parallel thread options according to an analytical model that utilizes a degree of parallelism from the query state of each executing query in the set.

A computer-implemented method is also described herein. In embodiments, the computer-implemented method is for automatic selection of DOP for efficient execution of queries in a database system, as described herein.

The computer-implemented method may be implemented by a database host, a query host, and/or a query system, in embodiments. The method includes receiving an incoming query associated with a database of a query system, and determining a set of executing queries being executed by the query system and a query state of each executing query in the set. The computer-implemented method also includes calculating execution times for executing the incoming query at least partially concurrently with the set of executing queries, the execution times being calculated according to ones of a set of parallel thread options. The computer-implemented method further includes initializing execution of the incoming query, against the database, with a number of processing threads that is at least based on the query state of each executing query in the set and one of the set of parallel thread options having an execution time of the execution times that corresponds to a time of completion attribute.

In an embodiment of the computer-implemented method, the time of completion attribute is an earliest time of completion.

In an embodiment of the computer-implemented method, the query state of each executing query in the set respectively comprises one or more of indicia of work remaining before completion or a number of threads utilized.

In an embodiment of the computer-implemented method, the at least one feature of the incoming query is obtained from a query plan and includes a query cost or operator level details.

In an embodiment, the computer-implemented method further includes determining at least one feature of the incoming query, and determining a system state of the query system. In the embodiment, the plurality of execution times is also based at least on the at least one feature of the incoming query and the system state of the query system.

In an embodiment of the computer-implemented method, the system state includes at least one of a processing thread attribute that includes at least one of a total number of processing threads or a currently available number of processing threads, an input/output (I/O) attribute that includes a measure of data throughput for the query system or the database, or a memory attribute that includes an availability measure of a buffer cache.

In an embodiment of the computer-implemented method, the set of executing queries includes at least one executing query each having a corresponding other one of the parallel thread options, the number of processing threads for the incoming query is proportional to another number of processing threads for the at least one executing query and is based at least on the one of the set of parallel thread options and each of the corresponding other one of the parallel thread options.

A computer-readable storage medium having program instructions recorded thereon that, when executed by a processing device, perform a method is also described herein. In embodiments, the method is for automatic selection of DOP for efficient execution of queries in a database system, as described herein.

The method includes receiving an incoming query associated with a database of a query system, the incoming query having at least one feature in a query plan that includes one or more of a query cost or operator level details, and determining a set of executing queries being executed by the query system and a query state of each executing query in the set. The method also includes calculating execution times for executing the incoming query at least partially concurrently with the set of executing queries, the execution times being calculated according to ones of a set of parallel thread options and at least based on the at least one feature. The method further includes initializing execution of the incoming query, against the database, with a number of processing threads that is at least based on the query state of each executing query in the set and one of the set of parallel thread options having an execution time of the execution times that corresponds to a time of completion attribute.

In an embodiment of the computer-readable storage medium, the time of completion attribute is an earliest time of completion.

In an embodiment of the computer-readable storage medium, the query state of each executing query in the set respectively comprises indicia of work remaining before completion for an associated executing query.

In an embodiment of the computer-readable storage medium, the system state includes at least one of a processing thread attribute that includes at least one of a total number of processing threads or a currently available number of processing threads, an input/output (I/O) attribute that includes a measure of data throughput for the query system or the database, or a memory attribute that includes an availability measure of a buffer cache.

In an embodiment of the computer-readable storage medium, the set of executing queries includes at least one executing query each having a corresponding other one of the parallel thread options, and the time of completion attribute is a lowest average time of completion.

In an embodiment of the computer-readable storage medium, the set of executing queries includes at least one executing query each having a corresponding other one of the parallel thread options, the number of processing threads for the incoming query and the other number of processing threads for the at least one executing query are more than a total number of processing threads for the query system, and the number of processing threads for the incoming query is proportional to another number of processing threads for the at least one executing query and is based at least on the one of the set of parallel thread options and each of the corresponding other one of the parallel thread options.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
a processing system that includes one or more processors; and
a memory configured to store program code to be executed by the processing system, the program code configured to:
receive an incoming query associated with a database of a query system;
determine at least one feature of the incoming query;
determine a system state of the query system;
determine a set of executing queries being executed by the query system and a query state of each executing query in the set;
calculate a plurality of execution times for executing the incoming query at least partially concurrently with the set of executing queries, the plurality of execution times being calculated according to ones of a set of parallel thread options and based at least on the query state of each executing query in the set, and the at least one feature of the query or the system state; and initialize execution of the incoming query, against the database, with a number of processing threads that is at least based on the query state of each executing query in the set and one of the set of parallel thread options having an execution time of the execution times that corresponds to a time of completion attribute.

2. The system of claim 1, wherein the time of completion attribute is an earliest time of completion.

3. The system of claim 1, wherein the query state of each executing query in the set respectively comprises one or more of indicia of work remaining before completion, indicia of work completed since its execution, or a number of threads utilized, for an associated executing query.

4. The system of claim 1, wherein the system state includes at least one of:
   a processing thread attribute that includes at least one of a total number of processing threads or a currently available number of processing threads;
   an input/output (I/O) attribute that includes a measure of data throughput for the query system or the database; or
   a memory attribute that includes an availability measure of a buffer cache.

5. The system of claim 4, wherein the system further comprises at least one of a dynamic management view or a performance monitor, each of which is configured to determine at least a portion of one or more of the processing thread attribute, the I/O attribute, or the memory attribute.

6. The system of claim 1, wherein the at least one feature of the incoming query is obtained from a query plan and includes a query cost or operator level details.

7. The system of claim 1, wherein the program code includes an execution predictor and a parallelism selector;
   the execution predictor configured to calculate the plurality of execution times based at least on a machine-learning model that utilizes vectorized query features from a query plan of the incoming query; and
   the parallelism selector configured to determine the one of the set of parallel thread options according to an analytical model that utilizes a degree of parallelism from the query state of each executing query in the set.

8. A computer-implemented method, comprising:
   receiving an incoming query associated with a database of a query system;
   determining a set of executing queries being executed by the query system and a query state of each executing query in the set;
   calculating execution times for executing the incoming query at least partially concurrently with the set of executing queries, the execution times being calculated according to ones of a set of parallel thread options and the query state of each executing query in the set; and
   initializing execution of the incoming query, against the database, with a number of processing threads that is at least based on the query state of each executing query in the set and one of the set of parallel thread options having an execution time of the execution times that corresponds to a time of completion attribute.

9. The computer-implemented method of claim 8, wherein the time of completion attribute is an earliest time of completion.

10. The computer-implemented method of claim 8, wherein the query state of each executing query in the set respectively comprises one or more of indicia of work remaining before completion or a number of threads utilized.

11. The computer-implemented method of claim 8, wherein the at least one feature of the incoming query is obtained from a query plan and includes a query cost or operator level details.

12. The computer-implemented method of claim 8, the method further comprising:
   determining at least one feature of the incoming query; and
   determining a system state of the query system;
   wherein the plurality of execution times is also based at least on the at least one feature of the incoming query and the system state of the query system.

13. The computer-implemented method of claim 12, wherein the system state includes at least one of:
   a processing thread attribute that includes at least one of a total number of processing threads or a currently available number of processing threads;
   an input/output (I/O) attribute that includes a measure of data throughput for the query system or the database; or
   a memory attribute that includes an availability measure of a buffer cache.

14. The computer-implemented method of claim 8, wherein the set of executing queries includes at least one executing query each having a corresponding other one of the parallel thread options; and
   wherein the number of processing threads for the incoming query is proportional to another number of processing threads for the at least one executing query and is based at least on the one of the set of parallel thread options and each of the corresponding other one of the parallel thread options.

15. A computer-readable storage medium having program instructions recorded thereon that, when executed by a processing device, perform a method, the method comprising:
   receiving an incoming query associated with a database of a query system, the incoming query having at least one feature in a query plan that includes one or more of a query cost or operator level details;
   determining a set of executing queries being executed by the query system and a query state of each executing query in the set;
   calculating execution times for executing the incoming query at least partially concurrently with the set of executing queries, the execution times being calculated according to ones of a set of parallel thread options and at least based on the query state of each executing query in the set, and the at least one feature; and
   initializing execution of the incoming query, against the database, with a number of processing threads that is at least based on the query state of each executing query in the set and one of the set of parallel thread options having an execution time of the execution times that corresponds to a time of completion attribute.

16. The computer-readable storage medium of claim 15, wherein the time of completion attribute is an earliest time of completion.

17. The computer-readable storage medium of claim 15, wherein the query state of each executing query in the set respectively comprises indicia of work remaining before completion for an associated executing query.

18. The computer-readable storage medium of claim 15, wherein the system state includes at least one of:

a processing thread attribute that includes at least one of a total number of processing threads or a currently available number of processing threads;

an input/output (I/O) attribute that includes a measure of data throughput for the query system or the database; or a memory attribute that includes an availability measure of a buffer cache.

19. The computer-readable storage medium of claim 15, wherein the set of executing queries includes at least one executing query each having a corresponding other one of the parallel thread options; and wherein the time of completion attribute is a lowest average time of completion.

20. The computer-readable storage medium of claim 15, wherein the set of executing queries includes at least one executing query each having a corresponding other one of the parallel thread options;

wherein the number of processing threads for the incoming query and the other number of processing threads for the at least one executing query are more than a total number of processing threads for the query system; and wherein the number of processing threads for the incoming query is proportional to another number of processing threads for the at least one executing query and is based at least on the one of the set of parallel thread options and each of the corresponding other one of the parallel thread options.

\* \* \* \* \*